United States Patent [19]

Conte

[11] Patent Number: 4,862,635
[45] Date of Patent: Sep. 5, 1989

[54] SNELLED FISHHOOK CASE

[76] Inventor: Robert Conte, 2477 W. Lincoln, Apt. 93, Anaheim, Calif. 92801

[21] Appl. No.: 190,040

[22] Filed: May 4, 1988

[51] Int. Cl.$^4$ .............................................. A01K 97/00
[52] U.S. Cl. ................... 43/57.1; 206/315.11; 242/96
[58] Field of Search .............. 43/54.1, 57.1, 57.2; 206/303, 315.11, 389, 533, 538, 539; 220/23.83; 242/96; 16/DIG. 30

[56] References Cited

U.S. PATENT DOCUMENTS

| 2,670,564 | 3/1954 | Keener | 43/57.5 |
|---|---|---|---|
| 2,716,302 | 8/1955 | Dutton | 43/57.5 |
| 2,763,957 | 9/1956 | Roberts | 43/57.5 |
| 3,008,664 | 11/1961 | McCormick | 242/96 |
| 3,039,226 | 6/1962 | Bagdonas | 43/57.5 |
| 3,396,604 | 8/1968 | Samuels et al. | 16/DIG. 30 |
| 3,890,737 | 6/1975 | Jones | 43/57.5 R |
| 3,991,507 | 11/1976 | Bart | 43/54.5 R |
| 4,030,228 | 6/1977 | Schaefers | 43/57.5 R |
| 4,036,451 | 7/1977 | Pipkin | 206/389 |
| 4,200,249 | 4/1980 | Synstelien et al. | 43/57.1 |
| 4,452,003 | 6/1984 | Deutsch et al. | 206/315.11 |
| 4,583,315 | 4/1986 | Schreck | 43/54.1 |
| 4,586,671 | 5/1986 | Piana et al. | 206/389 |
| 4,653,833 | 3/1987 | Czubernat et al. | 242/96 |

Primary Examiner—Nicholas P. Godici
Assistant Examiner—William Scott Andes
Attorney, Agent, or Firm—Jack W. Edwards

[57] ABSTRACT

A snelled fishhook case has a spool and a sleeve that fit coaxially together, each being rotatable relative to the other about the common axis, with the sleeve positioned about the spool. A radial opening in the sleeve and an axial slit in the spool can be aligned in registry to provide radial access to a spool cavity that receives the whole hook portion of a snelled fishhook. An annular space is defined between the spool and the sleeve and extends axially opposite the sleeve opening. The leader portion of the snelled fishhook can be wound or unwound about the spool in the annular space covering the spool slit.

8 Claims, 1 Drawing Sheet

U.S. Patent  Sep. 5, 1989  4,862,635
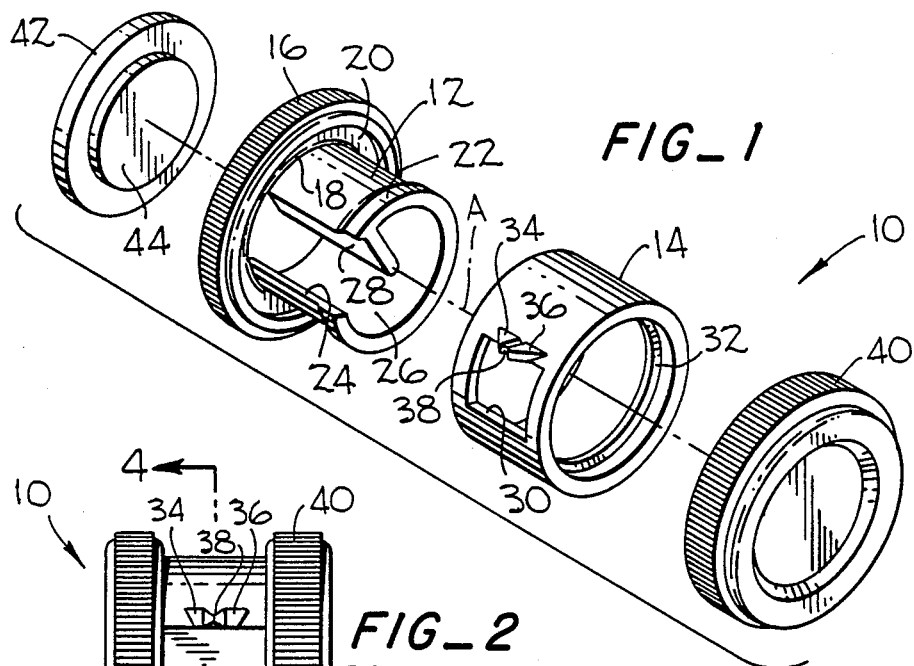
FIG_1
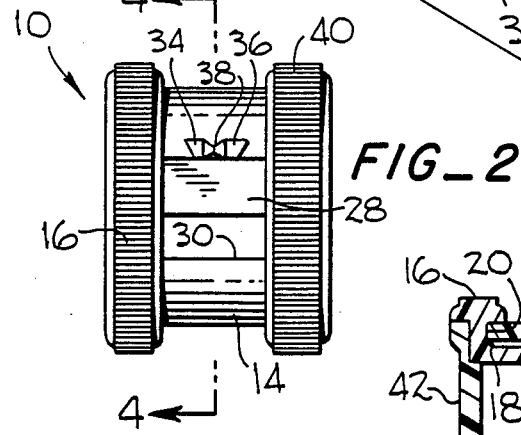
FIG_2
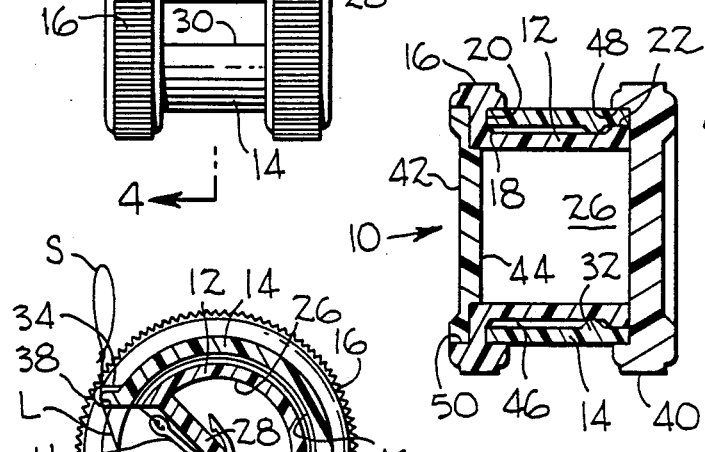
FIG_3  FIG_4
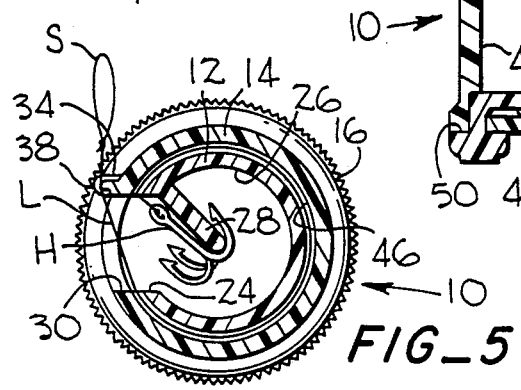
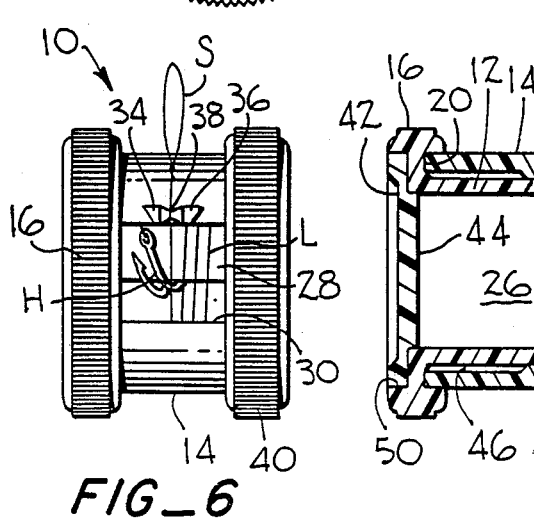
FIG_5
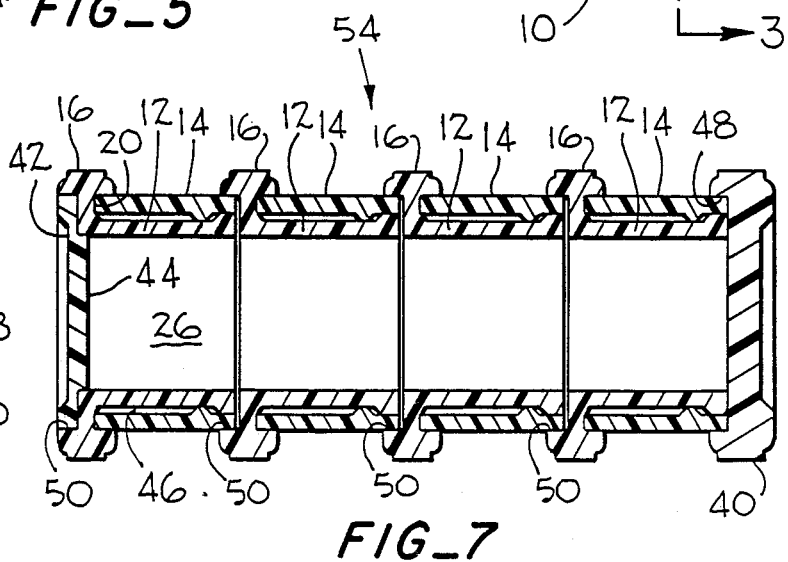
FIG_6  FIG_7

SNELLED FISHHOOK CASE

BACKGROUND OF THE INVENTION

1. Field of the Invention This invention relates to a case for holding a snelled fishhook having a hook portion and an associated leader portion. More specifically, the case has a cavity for storing the hook portion within a spool and an annular space between the spool and a coaxial sleeve into which the leader portion can be wound, with the case operating as a reel.

2. Description of the Prior Art Fishermen normally prepare snelled fishhooks during leisure time rather than while they are engaged in fishing. The hook portions vary in type and size, and the leader portions vary in size, depending upon the kind of fish sought and the conditions prevailing at the time of fishing. When artificial flies are used, the fly should resemble insects existing at the time and place of fishing. Snelled fishhooks can be readily attached or removed from a fishing line so that interchanging one hook with another can be made without too much delay. However, the time saved can be lost if the leader portions and the hook portions become tangled during storage and handling, requiring considerable time for disentanglement.

Receptacles, spools and reels have been provided for storage of snelled fishhooks in an effort to solve problems of entanglement, exposed hooks, keeping hook tips and barbs sharp, exposed leaders, artificial flies deformed by leaders coiled tightly thereabout, separation from other snelled hooks, and rapid loading or removal of a snelled fishhook from a casing. Prior art of which I am aware includes the following patents: Keener, U.S. Pat. No. 2,670,564, titled "Fishhook and Leader Box"; Dutton, U.S. Pat. No. 2,716,302, titled "Containers for Fish Hooks and Leaders"; Roberts, U.S. Pat. No. 2,763,957, titled "Snelled Hook Container"; McCormick, U.S. Pat. No. 3,008,664, titled "Reel and Winder for Fishing leaders"; Bagdonas, U.S. Pat. No. 3,039,226, titled "Fishing Tackle Container"; Jones, U.S. Pat. No. 3,890,737, titled "Fish Hook Receptacle"; Bart, U.S. Pat. No. 3,991,507, titled "Collapsible Organizer Receptacle For Fishing Leader"; Schaefers, U.S. Pat. No. 4,030,228, titled "Cartridge For Fishing Flies and Leaders"; and Schreck, U.S. Pat. No. 4,583,315, titled "Supply and Dispenser Device for Fishing Lines and Like Threads". While the above patents show a variety of receptacles for snelled fishhooks, problems remain to be solved.

SUMMARY OF THE INVENTION

An object of the present invention is to provide a case for a snelled fishhook having a hook portion and a leader portion wherein each portion is enclosed in a separate storage space and to keep tips and barbs of the hook portion sharp and to prevent the leader portion from tangling or deforming artificial flies.

Another object of the invention is to provide a snelled fishhook case in the form of a reel that can be rapidly loaded and unloaded, with the hook portion loading first so that a snelled fishhook attached to a line on a fishing pole can be protected by the case during transportation or storage.

A further object of the invention is to provide a snelled fishhook case in units that can be joined together to form a composite case for holding a plurality of snelled fishhooks.

In accordance with the present invention, a case is formed by a spool and a sleeve fitting coaxially thereabout that are rotatable relative to each other about the common axis. A radial opening in the sleeve and an axial slit in the spool when aligned in registry provide radial access to a spool cavity for receiving the whole hook portion of a snelled fishhook. The spool and the sleeve define an annular space therebetween that extends axially opposite the sleeve opening. Upon relative rotation between the spool and the sleeve, a leader portion, extending from the hook portion through the axial slit in the spool and the radial opening in the sleeve, can be wound or unwound about the spool, in the annular space, covering the spool slit.

In a preferred embodiment of the invention, a flange extends inwardly of the spool adjacent the axial slit for engaging and anchoring the hook portion in the spool cavity. The sleeve is locked axially between a spool turning wheel that contacts one end of the sleeve and a collar that projects radially outward at the opposite end of the spool to contact an annular rib projecting radially inward from the sleeve. Projections on the sleeve form a notch in which the leader portion can be inserted and anchored by engaging a loop at one end thereof with the projections. A plurality of snelled fishhook case units can be joined together by plugging a sleeve of one unit into a socket in the spool of an adjacent unit.

Advantages of the invention include separate storage spaces for a hook portion and a leader portion, rapid loading and unloading of the snelled fishhook case that acts as a reel, covering a snelled fishhook attached to a line on a fishing pole, and forming a composite case for holding a plurality of snelled fishhooks with a plurality of case units joined together.

BRIEF DESCRIPTION OF THE DRAWINGS

FIG. 1 is an exploded perspective view of a snelled fishhook case embodying the present invention.

FIG. 2 is a front elevational view of the case shown in FIG. 1.

FIG. 3 is an axial section of the case shown in FIG. 2, taken on the line 3-3 of FIG. 4.

FIG. 4 is a transverse action taken on the line 4-4 of FIG. 2.

FIGS. 5 and 6 are diagrammatic views showing a snelled fishhook stored within the case.

FIG. 7 is an axial section of a composite case having a plurality of case units joined together for holding a plurality of snelled fishhooks.

DESCRIPTION OF THE PREFERRED EMBODIMENTS

With reference to FIG. 1, a snelled fishhook case, indicated by general reference numeral 10, is formed by a spool 12 and a sleeve 14. At one end of the spool, a wheel 16 projects radially outward for turning the spool about a central axis A. A bevel surface 18 is provided between the spool barrel and the wheel. Radially outward from the bevel surface is a socket 20 for receiving an end of the sleeve. A collar 22 projects radially outward at the opposite end of the spool, and an axial slit 24 extends through the collar and the spool to provide radial access to a cavity 26 therein. This cavity is of a size sufficient to receive the whole hook portion of a snelled fishhook. Such hook portions can be of various types such as conventional fishhooks, treble fishhooks, or artificial flies. Extending inwardly of the spool cavity adjacent the axial slit is a flange 8 for engaging and anchoring the hook portion therein.

The sleeve 14 has a radial opening 30 providing access to the interior thereof. An annular rib 32 projects radially inward of the sleeve at an axial location near one end thereof. Extending outwardly of the sleeve are a pair of projections 34 and 36 that form a notch 38 therebetween for fastening the leader portion of a snelled fishhook to the sleeve. A wheel 40 is provided for turning the sleeve. An end plug 42 having a boss 44 is provided for closing one end of the spool cavity 26.

Looking now at FIGS. 2 and 3, the case 10 is assembled as shown. The sleeve 14 slips axially about the spool 12, and the collar 22 can be radially compressed due to the axial slit 24 enabling the annular rib 32 to slip over the collar. As shown in FIG. 3, the sleeve is interlocked axially between the socket 20 of the spool turning wheel 16 and the collar that engages the annular rib. An annular space 46 is defined between the spool and the sleeve, and extends axially opposite the sleeve opening 30 between the bevel surface 18 adjacent the spool turning wheel and the annular rib of the sleeve. A socket 48 is provided in the sleeve turning wheel 40 and the end of the sleeve adjacent the annular rib plugs into this socket. A suitable adhesive can be used in the socket for fixing the wheel to the sleeve and thereby preventing slippage between the sleeve and the wheel. A socket 50 is provided in the spool turning wheel 16 and the end plug 42 fits therein with the boss 44 plugging into the spool cavity 26 for closing that end thereof.

The spool 12 and the sleeve 14 ca rotate relative to each other about the common central axis A by turning one and holding the other, or by turning one in the opposite direction from the direction in which the other is turned. As shown in FIG. 4, the spool and the sleeve can be aligned so that the axial slit 24 and the radial opening 30 are in registry. In this position, a hook portion H of a snelled fishhook can be inserted into the cavity 26 and engage the flange 28, as shown in FIG. 5. Upon relative rotation of the spool and the sleeve, the leader portion L of the snelled fishhook is wound about the spool in the annular space 46. This space has a cross-sectional area sufficient to accommodate leader portions as long as desired for the particular type of hook portion, but short leader portions of a length sufficient to make but one turn about the spool and fit into the notch 38 can also be accommodated. When the leader portion is inserted into the notch, a loop S at the end of the leader portion prevents this portion from being drawn back into the annular space. Since the leader portion is wound about the spool covering the axial slit, as shown in FIG. 6, the hook portion is retained within the cavity even if it falls off the flange 8 and the radial opening and the axial slit are in registry. Preferably, in a normal storage position, the radial opening and the axial slit are not in registry so that the hook portion is completely enclosed.

The snelled fishhook can be rapidly removed from the case 10 by removing the leader portion L from the notch 38 and pulling on the leader portion until it stops unwinding from the spool 12. The hook portion H is disengaged from the flange 28 and the snelled fishhook is ready for use.

A composite case 54, shown in FIG. 7, is made of four case units, each having a spool 12 and a sleeve 14 that are joined together axially by plugging the end of a sleeve into the socket 50 of an adjacent spool turning wheel 16. An end plug 42 with a boss 44 covers one end of the cavity 26. The opposite end of the case is covered by a sleeve turning wheel 40 having a socket 48 therein into which the end of a sleeve 14 plugs. Each unit of this composite case operates as the previously described case 10.

It should be noted that either one end or an entire case 10 can be made of transparent plastic so that hook portion H enclosed therein can be viewed from the outside. This is particularly useful when the hook portion is an artificial fly. Alternatively, the sleeves 14 can be made of opaque plastic in a variety of colors for color coding the contents of the cases. The plastic of which the cases are made is a rugged, durable, non-corrosive material. These cases can be made in various sized diameters to accommodate different sized hook portions. The cases can be opened so that the axial slit 24 and the radial opening 30 are in registry, and then flushed with clean water without removing the snelled fishhooks. When the cases are closed with the slit and opening not in registry, the case will stay buoyant for a reasonable length of time for retrieval if accidentally dropped in the water.

From the foregoing description it will be seen that the hook portion H is stored in the cavity 26 and the leader portion 1 is stored separately in the annular space 46. This enables the tips and barbs of hook portions H to be kept sharp and prevents tangling of the leader portions L. Cases 10 and 54 can be rapidly loaded with a snelled fishhook or the fishhook can be rapidly unloaded from the case since these cases act as reels. A snelled fishhook attached to a line on a fishing pole can be protected during transportation and storage since the hook portion loads first into the case. A plurality of case units can be joined together into a composite case 54 for holding a plurality of snelled fishhooks.

Although the best mode contemplated for carrying out the present invention has been herein shown and described, it will be apparent that modifications and variations can be made without departing from what is regarded to be the subject matter of the invention.

I claim:

1. A case for a snelled fishhook having a hook portion and a leader portion, said case comprising:

a cylindrical spool having a cavity therein for receiving the whole hook portion and an axial slit providing radial access to the cavity for the hook portion, a spool turning wheel projecting radially outward at one end of the spool, a collar projecting radially outward at the opposite end of the spool, a sleeve fitting coaxially about the spool and having a radial opening that registers with the spool slit for providing access thereto, and an annular rib projecting radially inward of the sleeve at an axial location for interlocking the sleeve axially between the spool turning wheel and the collar, said spool collar being radially compressible due to the axial slit for enabling the annular rib to slip axially over the spool collar upon assembly thereof, said spool and said sleeve defining an annular space therebetween that extends axially opposite the sleeve opening, said spool and said sleeve being rotatable relative to each other about the common axis, whereby said hook portion can be inserted radially into the spool cavity or removed radially therefrom when the spool slit and the sleeve opening are in registry and the leader portion can be wound in the annular space about the spool covering the spool slit upon relative rotation between the spool and the sleeve.

2. The snelled fishhook case of claim 1 wherein said annular space between the spool and the sleeve is limited axially between the spool turning wheel and the annular rib of the sleeve.

3. The snelled fishhook case of claim 2 further including a sleeve turning wheel fixed to the sleeve end adjacent the annular rib and projecting radially outward therefrom.

4. The snelled fishhook case of claim 3 wherein said spool turning wheel has a socket of slightly larger diameter than the outer diameter of the sleeve on the side opposite from the spool.

5. The snelled fishhook case of claim 4 further including an end cap that plugs into the socket of the spool turning wheel, and a boss projecting from the end cap that fits into the spool cavity.

6. A case for a plurality of snelled fishhooks each having a hook portion and a leader portion, said case comprising:
   a plurality of cylindrical spools each having a cavity therein for receiving one whole hook portion and an axial split providing radial access to the cavity for the hook portion, and
   a plurality of sleeves each fitting coaxially about a spool and each having a radial opening that registers with the spool slit for providing access thereto,
   each spool having an integral spool turning wheel projecting radially outward at one end thereof,
   each spool turning wheel having on the side opposite from the spool a socket of slightly larger diameter than the outer diameter of a sleeve so that an adjacent sleeve can be plugged therein joining the spool and the adjacent sleeve together axially,
   said spools and said sleeve defining an annular space therebetween that extends axially opposite the sleeve opening,
   said spools and said sleeves being rotatable relative to each other about the common axis,
   whereby said hook portions can be inserted radially into the spool cavities or removed radially therefrom when the spool slit and the sleeve opening are in registry and the leader portion can be wound in the annular space about the spool covering the spool slit upon relative rotation between the spool and the sleeve.

7. A case for a snelled fishhook having a treble hook portion and a leader portion, said case comprising:
   a cylindrical spool having a cavity therein and an axial split, said cavity being of a size for receiving the whole treble hook portion and said slit being of a size enabling the treble hook portion to pass radially in and out of the spool;
   a flange located in the spool adjacent the axial slit and projecting therefrom into the spool cavity at an acute angle relative to a plane transversely of the axial slit so as to guide hook passage within the spool cavity, said flange extending rom adjacent the axial slit into the spool cavity a distance sufficient to retain the whole treble hook portion within the spool cavity when the hook portion is anchored to the flange;
   a sleeve fitting coaxially about the spool and having a radial opening therein of a size sufficient to receive the treble hook portion, said sleeve opening being aligned axially to register with the spool slit upon relative rotation of the sleeve or spool about the common axis;
   said spool and said sleeve defining an annular space therebetween that extends axially opposite the sleeve opening for receiving the leader portion when wound about the spool and spool slit by relative rotation between the spool and the sleeve;
   whereby the spool slit and the sleeve opening when in registry provide access for the whole treble hook portion to pass radially in and out of the case with the flange guiding the treble hook portion within the spool cavity to and from an anchorage position.

8. The snelled fishhook case of claim 7 further including means for fastening the leader portion to the sleeve to frictionally resist further winding of the leader portion onto the spool or unwinding therefrom.

* * * * *